United States Patent
Sumita et al.

(10) Patent No.: US 10,505,490 B2
(45) Date of Patent: Dec. 10, 2019

(54) MOTOR CONTROL SYSTEM

(71) Applicant: Hitachi, Ltd., Chiyoda-ku, Tokyo (JP)

(72) Inventors: Satoshi Sumita, Tokyo (JP); Yoshitaka Iwaji, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 16/076,752

(22) PCT Filed: Feb. 19, 2016

(86) PCT No.: PCT/JP2016/054773
§ 371 (c)(1),
(2) Date: Aug. 9, 2018

(87) PCT Pub. No.: WO2017/141411
PCT Pub. Date: Aug. 24, 2017

(65) Prior Publication Data
US 2019/0052214 A1    Feb. 14, 2019

(51) Int. Cl.
*H02P 27/06*    (2006.01)
*H02P 21/18*    (2016.01)
(Continued)

(52) U.S. Cl.
CPC .......... *H02P 27/06* (2013.01); *H02P 21/0021* (2013.01); *H02P 21/14* (2013.01);
(Continued)

(58) Field of Classification Search
CPC .......... H02P 27/06; H02P 21/18; H02P 21/22; H02P 21/14; H02P 26/026
(Continued)

(56) References Cited

U.S. PATENT DOCUMENTS

| | | | |
|---|---|---|---|
| 8,947,028 B2* | 2/2015 | Gu | H02P 29/0243 318/400.02 |
| 10,020,769 B2* | 7/2018 | Arabackyj | B62D 5/049 |

FOREIGN PATENT DOCUMENTS

| | | |
|---|---|---|
| JP | 5-236795 A | 9/1993 |
| JP | 9-113038 A | 5/1997 |

(Continued)

OTHER PUBLICATIONS

International Search Report (PCT/ISA/210) issued in PCT Application No. PCT/JP2016/054773 dated May 17, 2016 with English translation (two (2) pages).
(Continued)

*Primary Examiner* — Kawing Chan
(74) *Attorney, Agent, or Firm* — Crowell & Moring LLP

(57) ABSTRACT

The invention is directed to omit an adjustment work of a motor control system and increase versatility. Provided is a motor control system including: an inverter which outputs a voltage to a motor based on a voltage command; a current detecting unit which outputs a current detection value based on a current flowing through the motor of a state quantity detecting unit; a voltage command calculating unit which outputs the voltage command of the state quantity detecting unit based on the high-order command and the current detection value of the state quantity detecting unit; a storage unit which outputs a data set of the quantity of state of the state quantity detecting unit based on the quantity of state of a driving target of the motor of the state quantity detecting unit; an abnormality degree calculation equation updating unit which outputs an abnormality degree calculation equation for computing the abnormality degree of the driving target of the state quantity detecting unit based on the data set of the state quantity detecting unit; an abnormality degree calculating unit which outputs the abnormality degree based on the quantity of state of the state quantity (Continued)

detecting unit and the abnormality degree calculation equation of the state quantity detecting unit; and a voltage adjusting unit which outputs an adjustment voltage for adjusting the voltage command of the state quantity detecting unit based on the abnormality degree of the state quantity detecting unit.

11 Claims, 9 Drawing Sheets

(51) Int. Cl.
  *H02P 21/22* (2016.01)
  *H02P 21/00* (2016.01)
  *H02P 21/14* (2016.01)
  *H02P 29/024* (2016.01)
  *H02P 25/026* (2016.01)
(52) U.S. Cl.
  CPC .............. *H02P 21/18* (2016.02); *H02P 21/22* (2016.02); *H02P 29/0241* (2016.02); *H02P 25/026* (2013.01)

(58) Field of Classification Search
  USPC .................................................... 318/400.02
  See application file for complete search history.

(56) References Cited

FOREIGN PATENT DOCUMENTS

| JP | 2006-352988 A | 12/2006 |
| JP | 4221307 B2 | 2/2009 |
| JP | 2012-50155 A | 3/2012 |

OTHER PUBLICATIONS

Japanese-language Written Opinion (PCT/ISA/237) issued in PCT Application No. PCT/JP2016/054773 dated May 17, 2016 (three (3) pages).

* cited by examiner

MOTOR CONTROL SYSTEM

TECHNICAL FIELD

The present invention relates to a technique for improving versatility of a motor control system. Here, the motor control system is a system for controlling the motor in accordance with the specification of a target to be driven by the motor.

BACKGROUND ART

Motors and motor control systems for controlling the motors are widely applied as means to convert electric power into mechanical output, to fans, pumps, compressors, automobiles, railroads, for example. On the other hand, as a problem of the motor control system, a step-out caused by a sudden load torque (instability of motor speed and torque), vibration caused by pulsation load torque, and the like are known. As techniques for detecting and preventing these problems, there are PTLs 1 and 2.

In PTL 1, in order to detect the step-out caused by the sudden load, a motor current is Fourier-analyzed and its pulsating component is compared with a reference value. If a step-out occurs due to the sudden load torque, since the pulsating component of the motor current exceeds the reference value, it is possible to detect the step-out. Furthermore, by transmitting information on the loss of synchronization detection to a host controller, safety can be improved.

PTL 2 reduces vibrations due to the pulsation load torques. A rotor position is estimated from the motor current, and the pulsation load torque is estimated by substituting the position estimation value into the motion equation. Next, Fourier analysis is performed on the pulsation load torque, and the output voltage of the inverter is pulsed so as to cancel each frequency component. If the pulsation amount of the output voltage is appropriate, the motor torque and the pulsation load torque cancel each other out and the vibration is reduced.

CITATION LIST

Patent Literature

PTL 1: JP-A-2012-50155
PTL 2: Japanese Patent No. 4221307

SUMMARY OF INVENTION

Technical Problem

A common problem of PTLs 1 and 2 is the necessity of an adjustment work of the control parameters. For example, there are a reference value of a current pulsation component of PTL 1, an upper limit order of the Fourier analysis of PTL 2, and the like. When the reference value of the current pulsation component is set to a lower value, erroneous detection increases, and when the reference value is set to a high value, oversight is not overlooked. Also, when the upper limit number of Fourier analysis is set to a low value, the vibration cannot be suppressed, and when the upper limit is set to a high value, the calculation amount increases unnecessarily. Therefore, these control parameters need to be adjusted for each motor control system, and the development period is prolonged.

An object of the present invention is to omit the adjustment work of the motor control system and to increase versatility.

Solution to Problem

Features of the present invention for solving the above problem is as follows, for example.

Provided is a motor control system including: an inverter which outputs a voltage to a motor based on a voltage command; a current detecting unit which outputs a current detection value based on a current flowing through a motor of a state quantity detecting unit 42; a voltage command calculating unit which outputs the voltage command of the state quantity detecting unit 42 based on a high-order command and the current detection value of the state quantity detecting unit 42; a storage unit which outputs a data set of the quantity of state of the state quantity detecting unit 42 based on the quantity of state of a driving target of the motor of the state quantity detecting unit 42; an abnormality degree calculation equation updating unit which outputs an abnormality degree calculation equation for computing the abnormality degree of the driving target of the state quantity detecting unit 42 based on the data set of the state quantity detecting unit 42; an abnormality degree calculating unit which outputs the abnormality degree based on the quantity of state of the state quantity detecting unit 42 and the abnormality degree calculation equation of the state quantity detecting unit 42; and a voltage adjusting unit which outputs an adjustment voltage for adjusting the voltage command of the state quantity detecting unit 42 based on the abnormality degree of the state quantity detecting unit 42.

Advantageous Effects of Invention

According to the present invention, the adjustment work of the motor control system can be omitted, and versatility can be enhanced. The problems, configurations and effects other than those described above will be clarified by the description of the embodiments below.

DESCRIPTION OF EMBODIMENTS

Figure 1:
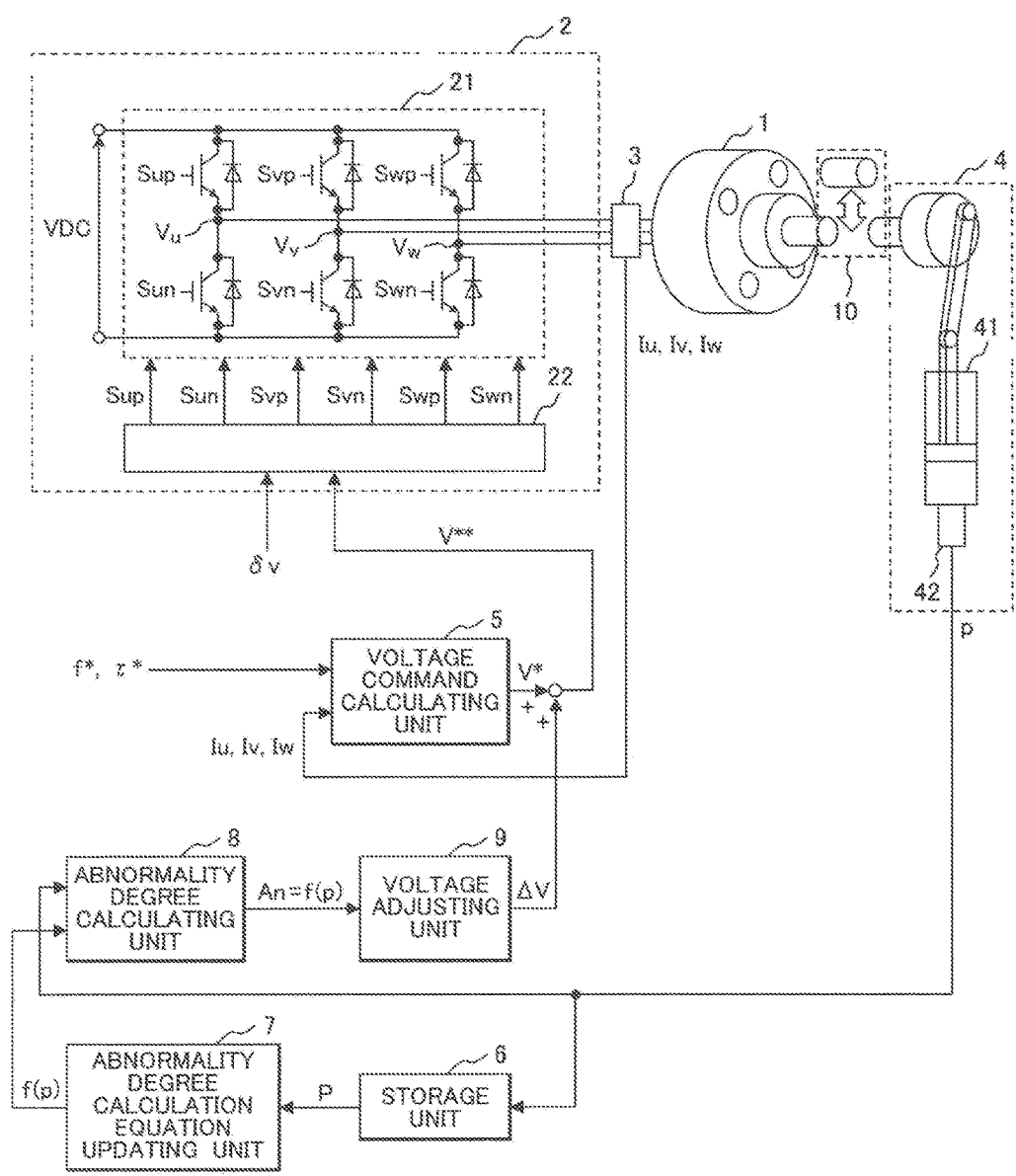
FIG. 1 is a configuration diagram of a motor control system according to a first embodiment.

Hereinafter, embodiments of the present invention will be described with reference to the drawings and the like. The following description illustrates concrete examples of the contents of the present invention, the present invention is not limited to these descriptions, and various changes and modifications made by those skilled in the art can be made within the scope of the technical idea disclosed in this specification. Further, in all the drawings for explaining the present invention, those having the same function will be denoted by the same reference numerals, and the repetitive description thereof may be omitted.

First Embodiment

A first embodiment will be described with reference to FIGS. 1 to 8. FIG. 1 is a configuration diagram of a motor control system according to the first embodiment.

When three-phase AC voltages (a U-phase voltage Vu, a V-phase voltage Vv, and a W-phase voltage Vw) are applied to a motor 1 by an inverter 2, three-phase AC currents (a U-phase current Iu, a V-phase current Iv, and a W-phase current Iw) flow, and a motor torque τ is generated.

Figure 2:
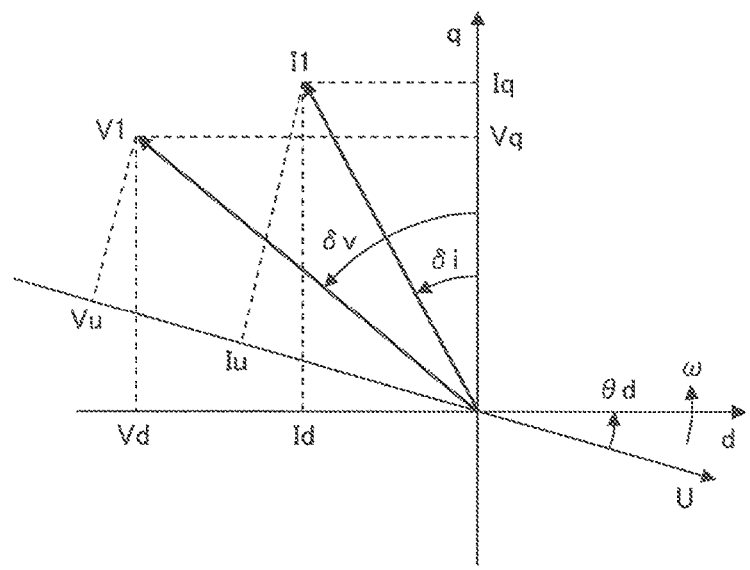
FIG. 2 is a vector diagram of a voltage and a current.

A quantity of state of the motor 1 will be described. FIG. 2 is a vector diagram of a voltage and a current. The U-axis represents a magnetic flux direction generated by a U-phase coil of the motor 1. A d-axis is an axis advanced by the rotor phase θd from the U-axis (counterclockwise: advance, clockwise: delay) and rotates in a counterclockwise direction at a rotational speed ω of the motor 1. A q-axis is an axis advanced by π/2 from the d-axis. A voltage vector V1 is a vector representing the amplitude and phase of the three-phase AC voltage, and the phase thereof is advanced by the voltage phase δv with respect to the q-axis as a reference. The U-axis component, the d-axis component, and the q-axis component of the voltage vector V1 are the U-phase voltage Vu, the d-axis voltage Vd, and the q-axis voltage Vq, respectively. The current vector I1 is a vector representing the amplitude and phase of the three-phase alternating current, and its phase is advanced by the current phase δi with respect to the q-axis as a reference. The U-axis component, the d-axis component, and the q-axis component of the current vector I1 are the U-phase current Iu, the d-axis current Id, and the q-axis current Iq, respectively. For example, when the motor 1 is a magnet motor, a motor torque τ of (Equation 1) is generated. In (Equation 1), Pm is the number of pole pairs, Ke is the induced voltage coefficient, Ld is the d-axis inductance, and Lq is the q-axis inductance.

[Equation 1]

$$\tau = 3/2 P_m(K_e + (L_d - L_q)I_d)I_q \quad \text{(Equation 1)}$$

The above is a description of the quantity of state of the motor 1.

The inverter 2 of FIG. 1 includes a main circuit 21 and a gate drive circuit 22. The inverter 2 outputs a voltage to the motor 1 based on the voltage command. The gate drive circuit 22 outputs the gate signals Sup, Sun, Svp, Svn, Swp and Swn based on the final voltage command V and the voltage phase δv. Here, the final voltage command V is the length of the voltage vector V1 of FIG. 1. At this time, ON•OFF of the gate signals Sup to Swn can be determined by, for example, PWM (Pulse Width Modulation) The main circuit 21 converts the DC voltage VDC into three-phase alternating voltages Vu, Vv, and Vw by switching, and applies thy three-phase alternating voltages to the motor 1.

The current detecting unit 3 outputs the detected value of the three-phase alternating current of the motor 1. In other words, the current detecting unit 3 outputs the current detection value, based on the current flowing through the motor 1. In order to simplify the description, it is assumed that the detection error is negligible, and the three-phase alternating current and its detection value are both denoted by symbols Iu, Iv, and Iw.

The driving target 4 is a system in which the motor 1 is used as a drive source. In FIG. 1, the driving target 4 is a compressor, and includes a cylinder 41 and a state quantity detecting unit 42. The driving target 4 outputs one or more types of quantity of state p, and in FIG. 1, the driving target is a temperature, a pressure, a vibration, and the like of the compressor. Otherwise, for example, if the driving target 4 is a fan and a pump, the quantity of state p is a wind speed, a flow rate, and the like.

The voltage command calculating unit 5 outputs the voltage command V* based on the high-order command and the current detection value. The high-order command is a command given from a host control system to the motor control system, and is, for example, a speed command f* or a torque command τ*. Specifically, the voltage command calculating unit 5 is, for example, vector control or V/f control.

A storage unit 6 stores the quantity of state p and outputs the data set P thereof. A difference between the quantity of state p and the data set P is that the quantity of state p is an instantaneous value and does not have a history, whereas the data set P has a history.

An abnormality degree calculation equation updating unit 7 outputs an abnormality degree calculation equation f(p) based on the data set P. The abnormality degree calculation equation f(p) is an equation for calculating the abnormality degree An, and the abnormality degree An is an index which represents the degree of the quantity of state p deviates from the normal state of the driving target 4. The normal state is a state in which the driving target 4 is in the most desirable state, for example, an operating state in which the driving target 4 can be driven with high efficiency and low vibration. When the quantity of state p is in the normal state, the abnormality degree An is zero, and as the quantity of state p deviates from the ideal state, the abnormality degree An increases.

Figure 3A:
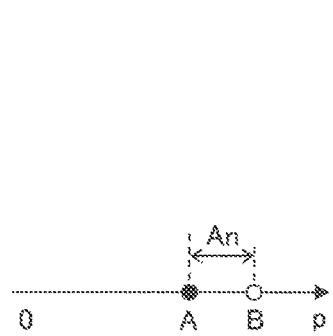
FIGS. 3A to 3D are normal states of a driving target.
Figure 3B:
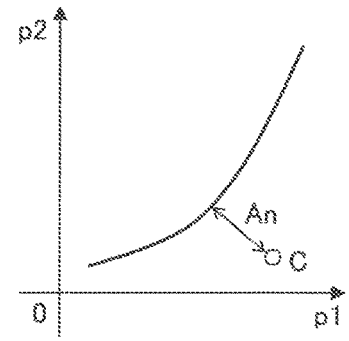

For example, when the driving target 4 is a compressor, the compressor pressure is considered as the quantity of state p, and it is assumed that the normal state is a point A in FIG. 3(a). At this time, assuming that the current compressor pressure is a point B, the abnormality degree An is a distance between points A and B. The quantity of state p is not necessarily one kind, but a plurality of cases may be considered. For example, when p1 is set as the compressor pressure and p2 is set as the refrigerant flow rate, its normal state is the curve illustrated in FIG. 3(b). The reason that p1 and p2 are in a positive correlation is that the refrigerant flow rate increases as the compressor pressure increases. Here, assuming that the present quantity of state p is the point C, the distance between the curve and the point C is the abnormality degree An. In this case, since the refrigerant flow rate is lower than the compressor pressure, for example, it is expected that the refrigerant leaks from the piping. Thus, the abnormality degree An is an index for finding abnormality of the driving target 4.

The abnormality degree calculating unit 8 outputs the abnormality degree "An=f(p)" based on the quantity of state p and the abnormality degree calculating formula f(p). In FIG. 3, the abnormality degree calculation equation f(p) is a linear distance between the normal state and the present quantity of state p, but it is not necessarily required to be a linear distance.

Figure 4A:
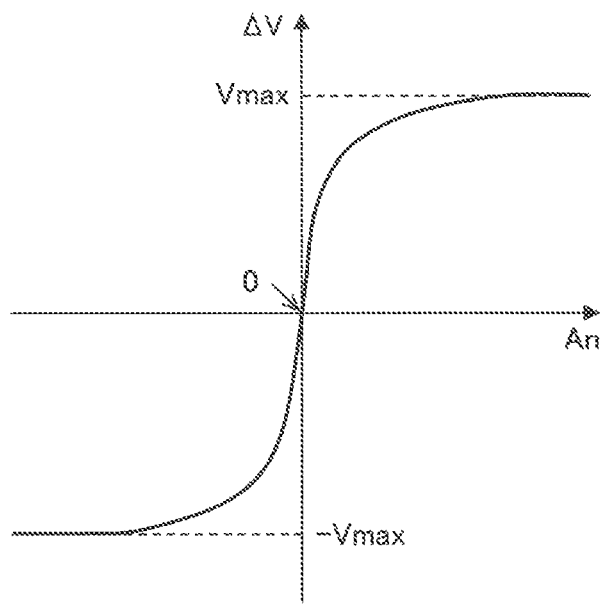
FIGS. 4A and 4B are input and output characteristic diagrams of a voltage adjusting unit.

The voltage adjusting unit 9 outputs an adjustment voltage ΔV for adjusting the voltage command based on the abnormality degree An. The conversion from the abnormality degree An to the adjustment voltage ΔV is, for example, as illustrated in FIG. 4, and "ΔV=0 in An=0" is satisfied. Other characteristics are arbitrary, but as illustrated in FIG. 4, by limiting at the maximum output voltage Vmax of the inverter 2, an abnormal operation of the inverter 2 can be prevented.

The constituent elements in the first embodiment are as described above. Characteristic units of the present invention will be described.

The characteristic unit of the present invention is feedback provided by the storage unit 6, the abnormality degree calculation equation updating unit 7, the abnormality degree calculating unit 8, and the voltage adjusting unit 9. When the driving target 4 is normal, the normal state illustrated in FIG. 3 is learned by the storage unit 6 and the abnormality degree calculation equation updating unit 7. When the normality and abnormality of the driving target 4 are unknown, the quantity of state p may be obtained by simulation simulating the driving target 4. In other words, learning in the normal state is learning of the abnormality degree calculation equation f(p), and after the learning of the abnormality degree calculation equation f(p), the adjustment voltage ΔV is output by the abnormality degree calculating unit 8 and the voltage adjusting unit 9. The feedback of the voltage adjusting unit 9 is different from the feedback of the voltage command operating unit 5 in the following points.

(1) Voltage command calculating unit 5 is feedback of the current detection value, that is, feedback of information on the motor 1

(2) On the other hand, the voltage adjusting unit 9 is feedback concerning the information of the driving target 4.

In order to detect the manufacturing error of the driving target 4 or the characteristic change during operation, feedback of the voltage adjusting unit 9 of (2) is indispensable. Conversely, by providing this, it is possible to omit the adjustment work of the motor control system and to enhance versatility.

The above description is about the characteristic units of the present invention. Next, the effects of the present invention will be described through specific examples at the time of starting the motor and at the time of pulsation load.

Figure 5:
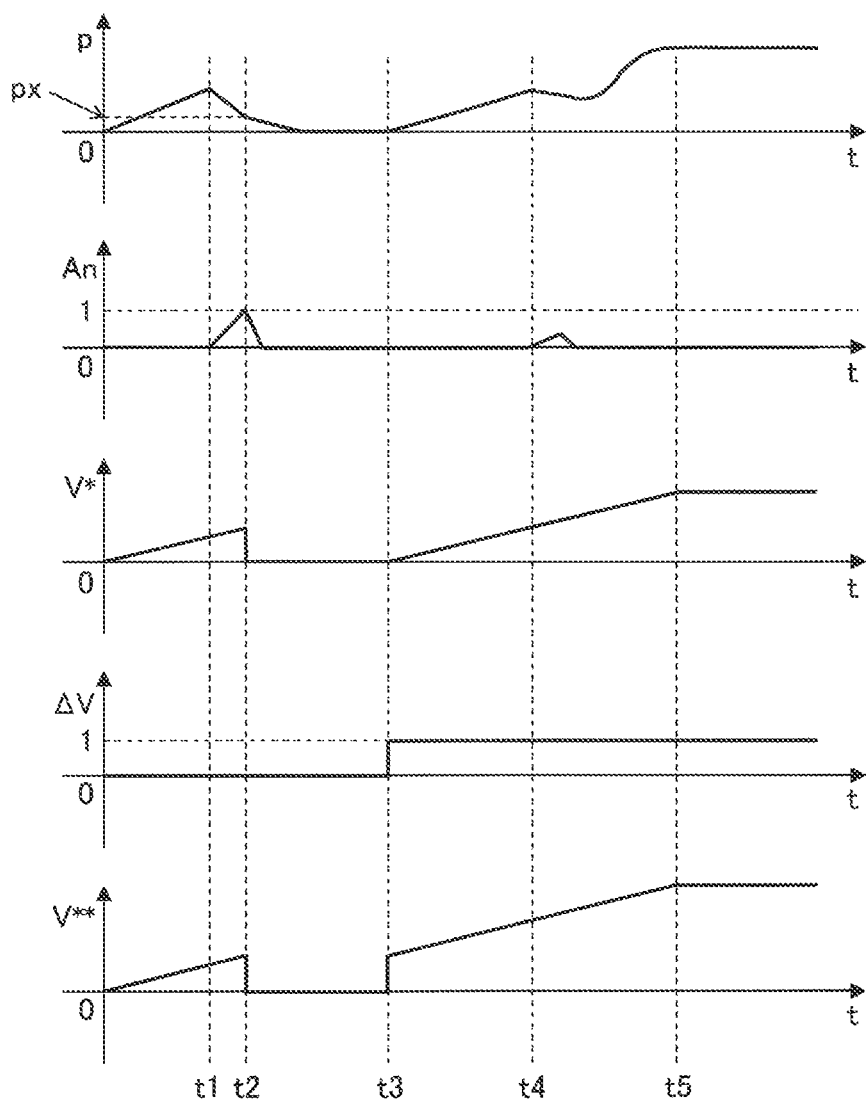
FIG. 5 is a waveform diagram at the time of startup.

FIG. 5 is a waveform diagram at the time of startup. In FIG. 5, the quantity of state p is a rotational speed of a fan and pump or the like. At time 0, the motor 1 starts up. At time t1, due to an unexpected load, the quantity of state p decreases and the abnormality degree An increases. At time t2, the abnormality degree An exceeds 1, and at the same time, the voltage command calculating unit 5 resets the voltage command V* to zero in order to protect the driving target 4. At time t3, the motor 1 is restarted, but the difference from the initial startup is that the adjustment voltage ΔV is set to 1 based on the abnormality degree An (=1) at time t2.

Figure 4B:
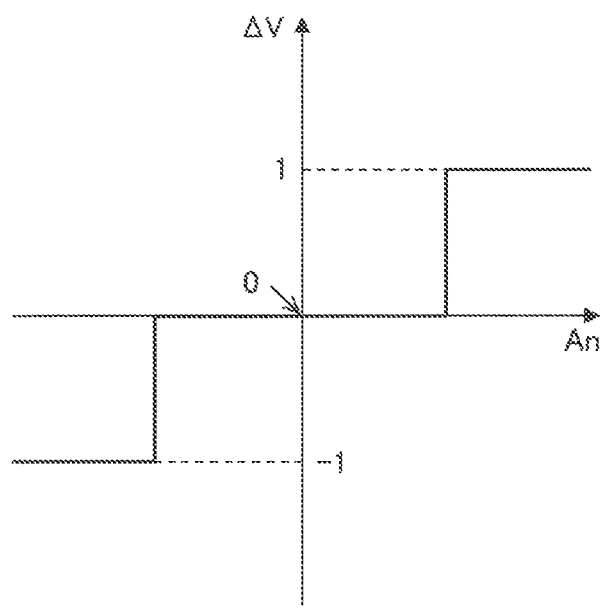
Figure 6:
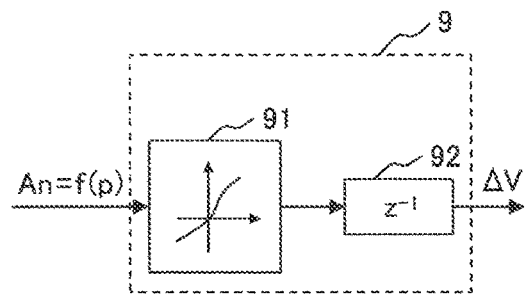
FIG. 6 is a configuration diagram of the voltage adjusting unit.

This is achieved, for example, as illustrated in FIG. 6, when the voltage adjusting unit 9 includes an abnormality degree and adjustment voltage conversion table 91 and a delay element 92, and the abnormality degree and adjustment voltage conversion table 91 is as illustrated in FIG. 4(b). In other words, the voltage adjusting unit 9 outputs the adjustment voltage at least once based on the abnormality degree. Since the adjustment voltage ΔV is set to 1 after the time t3 of FIG. 5, the final voltage command V** increases to that extent. At this time, the voltage command V* is the same as the initial startup. At time t4, the quantity of state p decreases again due to an unexpected load, but the final voltage command V** is larger than at the time of the previous startup, the quantity of state p increases again, and the abnormality degree An does not exceed 1. At time t5, the quantity of state p reaches an equilibrium state. According to the configuration of the present invention, re-startup of the motor 1 can be automated in this way.

In FIG. 5, even if the storage unit 6, the abnormality degree calculation equation updating unit 7, the abnormality degree calculating unit 8, and the voltage adjusting unit 9 are not provided, by setting the threshold value px for the quantity of state p, it is possible to perform the re-startup. However, due to the following problems, adjustment work of the threshold value px becomes complicated.

(1) The threshold value px varies depending on manufacturing errors of the motor 1 and the driving target 4 or characteristic changes during operation.

(2) Since there are a plurality of quantities of state p, there are also plural threshold values px.

(3) There is a case where abnormality of the driving target 4 cannot be determined only by the magnitude relation of the threshold value px. For example, there is a case of determining an abnormality by the distortion rate or frequency characteristic of the quantity of state p.

According to the configuration of the present invention, the problems of (1) to (3) above can be avoided, and re-startup of the motor 1 can be automated.

Figure 7:
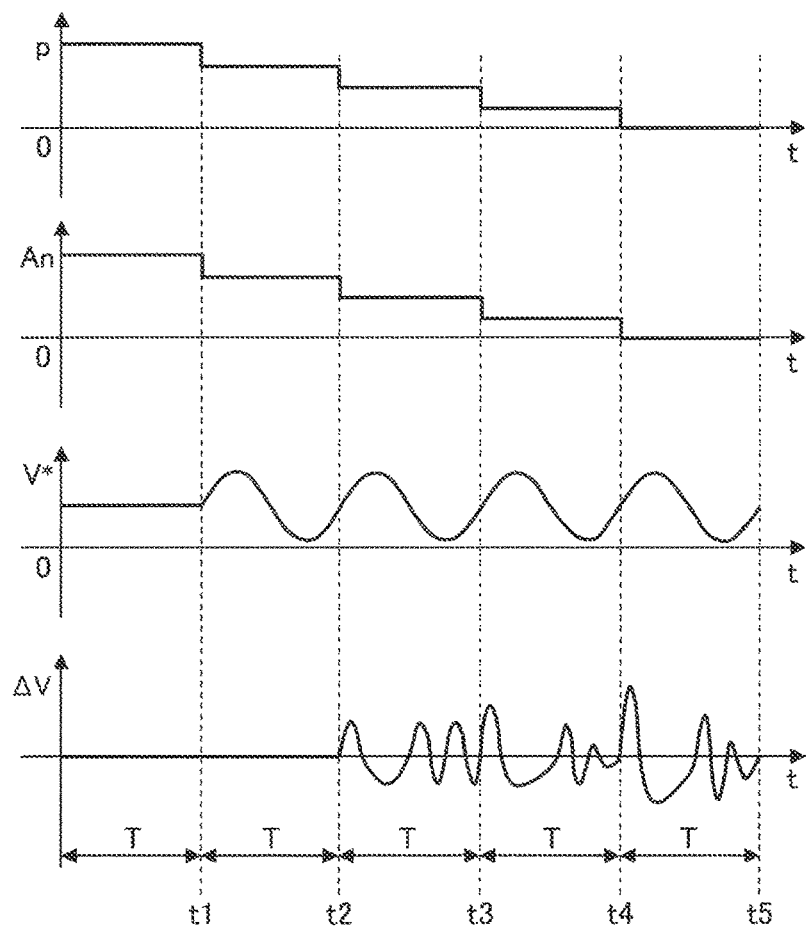
FIG. 7 is a waveform diagram at the time of torque pulsation.

FIG. 7 illustrates a waveform diagram during torque pulsation. In FIG. 7, the quantity of state p is the vibration amplitude of the compressor, and T is the cycle of the compressor. Since the load torque applied to the motor 1 by the compressor pulsates, at the time 0 to t1, the quantity of state p and the abnormality degree An are positive. At the time t1 to t2, the voltage command calculating unit 5 pulses the voltage command V* in a sinusoidal wave form at the following amplitude and frequency in order to cancel the pulsation of the load torque and reduce the quantity of state p.

(1) Amplitude: the value obtained by converting the torque pulsation amplitude into the voltage amplitude, using the electrical characteristic of the motor 1

(2) Frequency: same as the torque pulsation frequency (driving frequency of the compressor)

This can be achieved, for example, by using a vector control including the torque pulsation suppression control as the voltage command calculating unit 5. As a result, the quantity of state p at times t1 to t2 is reduced as compared with time 0 to t1. However, since the pulsation of the load torque includes harmonic components, the quantity of state p does not become zero. Therefore, at the times t2 to t3, the voltage adjusting unit 9 outputs the adjustment voltage ΔV including the harmonic to reduce the quantity of state p. Even after the time t3, the adjustment voltage ΔV is optimized by feedback of the state quantity detecting unit 42, the storage unit 6, the abnormality degree calculation equation updating unit 7, the abnormality degree calculating unit 8, and the voltage adjusting unit 9, and the quantity of state p is reduced. At the time t4, the quantity of state p becomes zero, and the optimization of the adjustment voltage ΔV is completed. The adjustment voltage ΔV after optimization has the following characteristics.

(1) Amplitude: it is a harmonic, and becomes variable within the cycle T of the compressor.

(2) Frequency: same as the torque pulsation frequency (driving frequency of the compressor)

The difference between the voltage command V* and the adjustment voltage Δ is the amplitude of (1), the former being a sine wave and the latter being a harmonic. Since the final voltage command V** is generated by these sums, arbitrary torque pulsation can be canceled and the quantity of state p can be reduced.

In FIG. 7, even if the storage unit 6, the abnormality degree calculation equation updating unit 7, the abnormality degree calculating unit 8, and the voltage adjusting unit 9 are not provided, by enhancing the responsiveness of the voltage command calculating unit 5 sufficiently, it is also possible to set the voltage command V* to a harmonic. However, due to the following problems, the work of adjusting the control parameters of the voltage command calculating unit 5 becomes complicated.

(1) The responsiveness of the required voltage command calculating unit 5 depends on the mechanical characteristics of the compressor.

(2) An improvement in responsiveness of the voltage command calculating unit 5 makes the motor control system unstable.

According to the configuration of the present invention, the problems of (1) and (2) above can be avoided, and the vibration of the compressor can be automatically reduced.

The above is the effect of the present invention. Furthermore, by changing the following units, its effect can be enhanced.

The abnormality degree calculation equation updating unit 7 outputs two or more abnormality degree calculation equations f(p), the abnormality degree calculating unit 8 outputs two or more abnormality degrees An, and the voltage adjusting unit 9 may control the adjustment voltage $\Delta V$ such that at least one other among the plurality of abnormality degrees is a minimum value in a range in which at least one of the plurality of abnormality degrees is a predetermined value or less. Thus, in a case where there is a trade-off relation between the plurality of abnormality degrees, the relation can be optimized.

Figure 8:
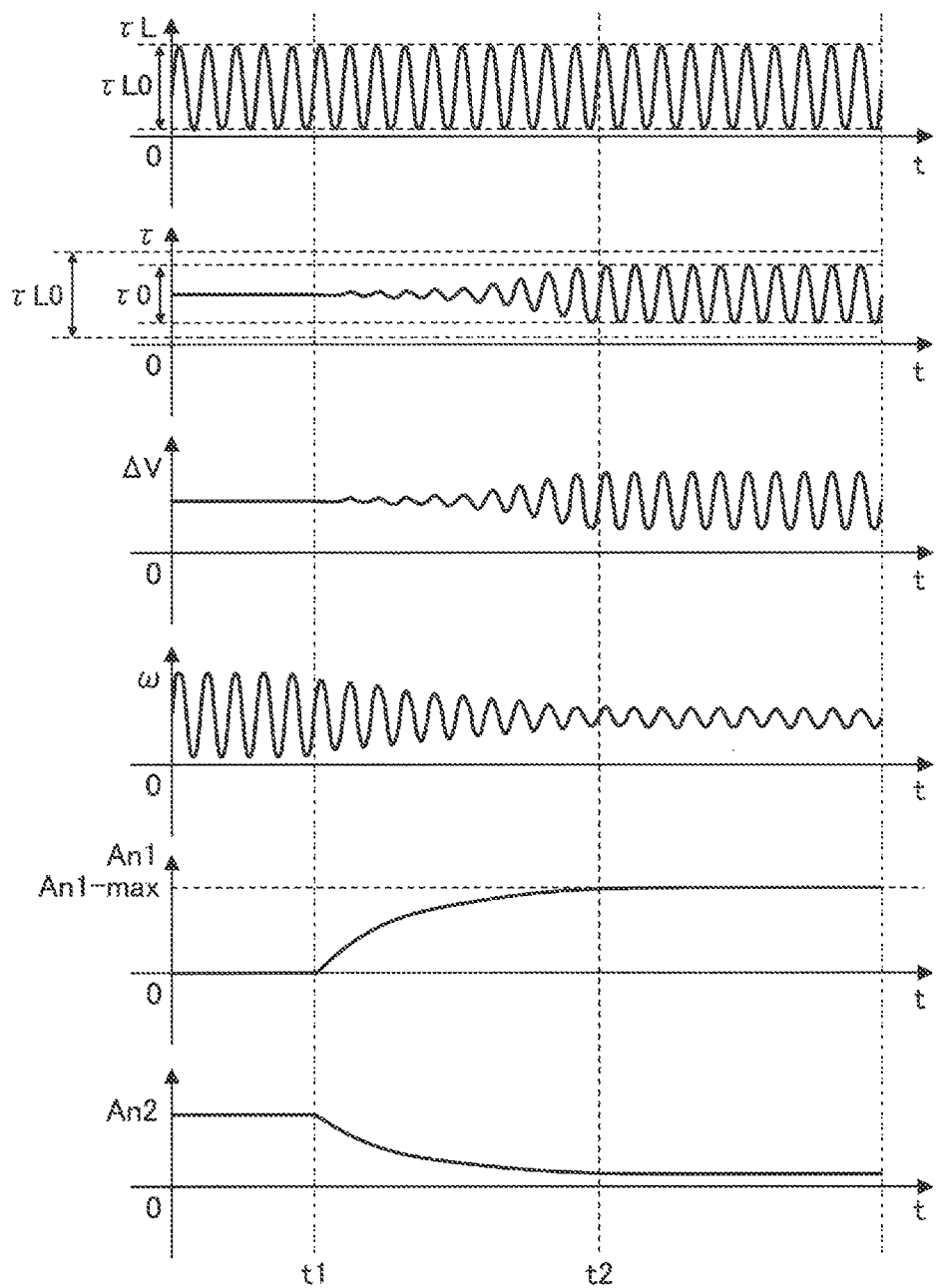
FIG. 8 is a waveform diagram when there are two degrees of abnormality.

For example, FIG. 8 illustrates a waveform diagram when there are two degrees of abnormality. $\tau L$ is a load torque, $\tau L0$ is a load torque amplitude, $\tau 0$ is a motor torque amplitude, An1 is an abnormality degree related to the efficiency of the motor 1, An1-max is an abnormality degree allowable maximum value, and An2 is an abnormality degree related to the vibration of the driving target 4. The abnormality degree allowable maximum value is an allowable maximum value of the abnormality degree An-1, and the control purpose here is to minimize the abnormality degree An2, while keeping the abnormality degree An1 at the abnormality degree allowable maximum value An1-max or less.

At the times 0 to t1 in FIG. 8, the load torque $\tau L$ pulsates, meanwhile, the motor torque $\tau$ does not pulsate, and the rotational speed w of the motor 1 is pulsed by the differential torque. In this case, since the motor torque $\tau$ is constant, the d-axis current Id and the q-axis current Iq of (Equation 1) can be controlled to be constant and minimum. Thus, the copper loss of the motor 1 is minimized, and the abnormality degree An1 becomes zero.

On the other hand, since the rotational speed w is pulsating, the abnormality degree An2 is positive. When the storage unit 6, the abnormality degree calculation equation updating unit 7, the abnormality degree calculating unit 8, and the voltage adjusting unit 9 are validated at the time t1, the adjustment voltage $\Delta V$ is generated. As a result, since the motor torque $\tau$ pulsates and the differential torque from the load torque $\tau L$ becomes small, the pulsation of the rotational speed $\omega r$ and the abnormality degree An2 also decrease.

On the other hand, since the d-axis current Id and the q-axis current Iq of (Equation 1) pulsate, the d-axis current Id and the q-axis current Iq become larger than a case where they are controlled to be constant and minimum, and the copper loss and the abnormality degree An1 also increase. As described above, the abnormality degrees An1 and An2 are in a trade-off relationship, and as the abnormality degree An2 is reduced, the abnormality degree An1 increases. Then, at the time t2, the abnormality degree An1 becomes equal to the abnormality degree allowable maximum value, and here, the optimization of the adjustment voltage $\Delta V$ is completed.

As described above, according to the configuration of the present invention, a trade-off between abnormality degrees can be automatically optimized. The type of abnormality increases as the size of the driving target 4 increases, and the trade-off relation between them becomes complicated, but the present invention is particularly effective in such a case.

Figure 9:
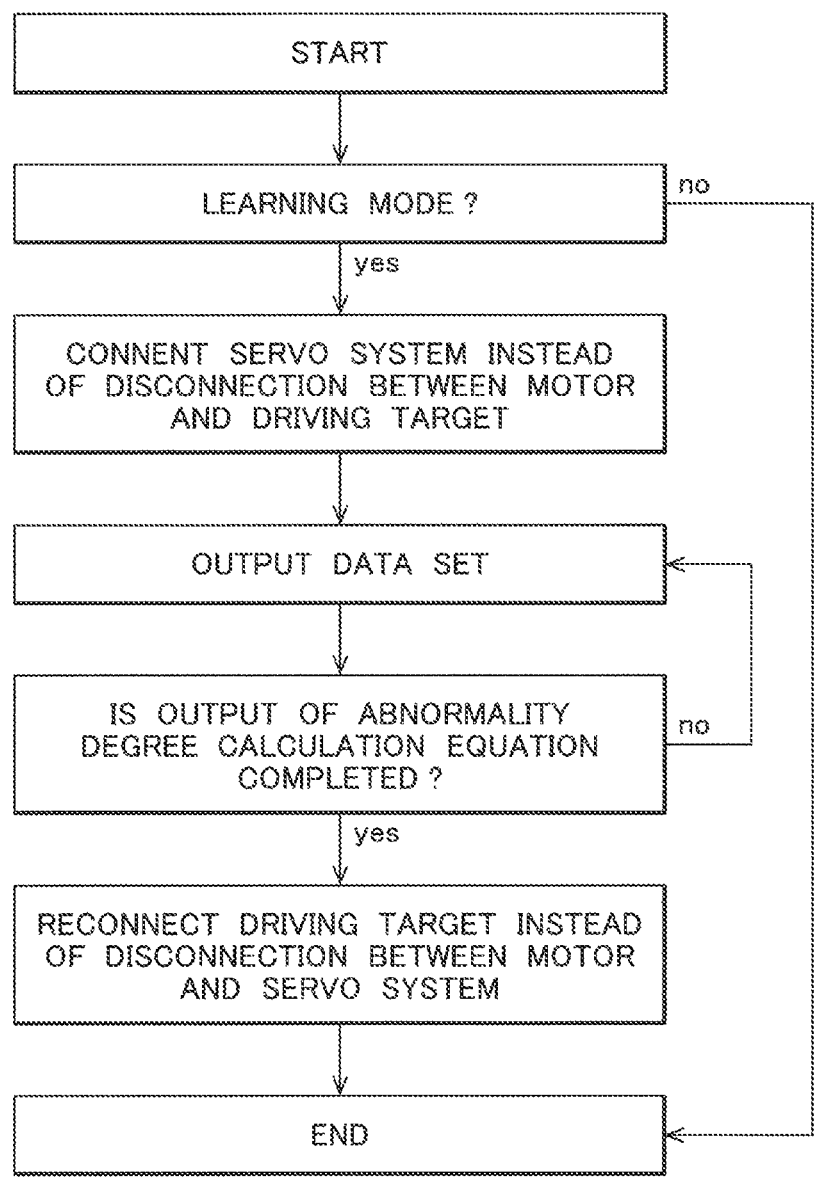
FIG. 9 is a flowchart in a learning mode.

The motor control system may be provided with a coupling unit 11 between the motor 1 and the driving target 4, and may be provided with a learning mode in which the motor 1 and the driving target 4 are temporarily disconnected. FIG. 9 illustrates a flowchart in the learning mode.

In the learning mode, the coupling unit 11 disconnects the motor 1 and the driving target 4 and connects the servo system instead. As a substitute for the driving target 4, the servo system simulates all or a part of considered driving patterns. At this time, the storage unit 6 outputs a plurality of data sets P, and the abnormality degree calculation equation updating unit 7 outputs the abnormality degree calculation equation f(p) at least once. After the output, the motor 1 and the servo system are disconnected from each other, and the driving target 4 is reconnected instead. After reconnection, an abnormality degree An is calculated based on the abnormality degree calculation equation f(p) which is output at the time of the learning mode. By using such a learning mode, the following effects can be obtained.

(1) When the driving target 4 is a large-scale system and cannot be moved with an arbitrary operation pattern, the data set P can be acquired in a short time.

(2) It is possible to acquire the data set P of a less frequent operation pattern in the driving target 4 in advance.

As a result of the above, it is possible to shorten the period until the abnormality degree calculation equation updating unit 7 initially outputs the abnormality degree calculation equation f(p), and it is also possible to shorten the introduction period of the motor control system.

Figure 3C:
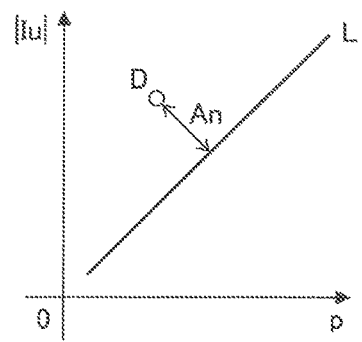

Instead of the data set of the quantity of state p, the storage unit 6 may output the data set of the quantity of state p and the current detection value. For example, it is assumed that the driving target 4 is a fan, the quantity of state p is the torque of the fan rotation shaft, and the current detection value is the amplitude |Iu| of the U-phase current Iu. At this time, the normal state is the straight line L as illustrated in FIG. 3(c). This is because the U-phase current amplitude |Iu| is in a proportional relation to the q-axis current Iq of FIG. 2 and the q-axis current Iq and the motor torque $\tau$ are in a proportional relation as indicated by (Equation 1). Assuming that the present quantity of state is the point D, the abnormality degree An is the distance to the straight line L. In this case, since the torque of the fan rotation shaft becomes smaller than the U-phase current amplitude |Iu|, for example, abnormalities, such as (1) the temperature of the motor 1 rises, the resistance value of the motor 1 increases, the efficiency of the motor 1 decreases, (2) the rotation shaft is loosened, and torque is not transmitted from the motor 1 to the fan, are considered. As described above, since the storage unit 6 outputs not only the data set of the quantity of state p but also the data set of the current detection value, it is possible to expand the abnormal range that can be found.

Figure 3D:
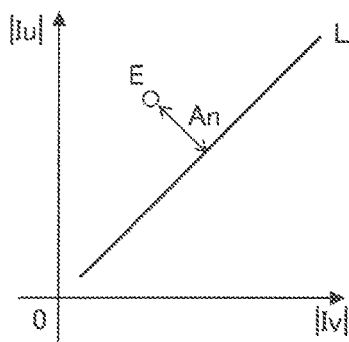

The storage unit 6 may output only the data set of the current detection value. For example, the normal state of the U-phase current amplitude |Iu| and the V-phase current amplitude |Iv| has an equivalent relation as illustrated in FIG. 3(d). This is because the difference between the U-phase current Iu and the V-phase current Iv is only the phase (deviation of $2\pi/3$) and the amplitude is equal. Since the U-phase current Iu is larger than the W-phase current Iw on the assumption that the present quantity of state is at the point E, for example, abnormalities, such as (1) U-phase impedance is lowered due to partial dielectric breakdown (short circuit) of the motor 1, and (2) the U-phase voltage Vu is smaller than the V-phase output voltage Vv due to manufacturing error of the inverter 2, are considered. As described above, even in the case where the storage unit 6 outputs only the data set of the current detection value, it is possible to detect the abnormality and also it is possible to reduce the number of input ports and the data communication volume of the storage unit 6. Accordingly, the cost of the storage unit 6 can be reduced.

The abnormality degree calculating unit 8 can enhance the accuracy of the abnormality degree An by outputting the abnormality degree An based on the data set P instead of the quantity of state p. That is, by incorporating the temporal change amount of the quantity of state p in the abnormality degree calculation, it is possible to detect a sudden abnormality, for example, an instantaneous power failure.

It is desirable that the update cycle of the abnormality degree calculation equation f(p) provided by the abnormality degree calculation equation updating unit 7 is longer than the calculation cycle of the abnormality degree calculating unit 8. As a result, since the calculation load of the abnormality degree calculation equation updating unit 7 is reduced and the responsiveness of the adjustment voltage $\Delta V$ is not deteriorated, the omission effect of the adjustment operation is not deteriorated. This is because the abnormality detection speed of the driving target 4 depends on the calculation cycle of the abnormality degree calculating unit 8, but does not depend on the content of the abnormality degree calculation equation f(p). In other words, the content of the abnormality degree calculation equation f(p) affects the abnormality degree detection accuracy of the driving target 4, and the update thereof is unnecessary after the learning has been sufficiently completed. Therefore, it is desirable that the update cycle of the abnormality degree calculation equation f(p) provided by the abnormality degree calculation equation updating unit 7 is longer than the calculation cycle of the abnormality degree calculating unit 8.

Second Embodiment

Figure 10:
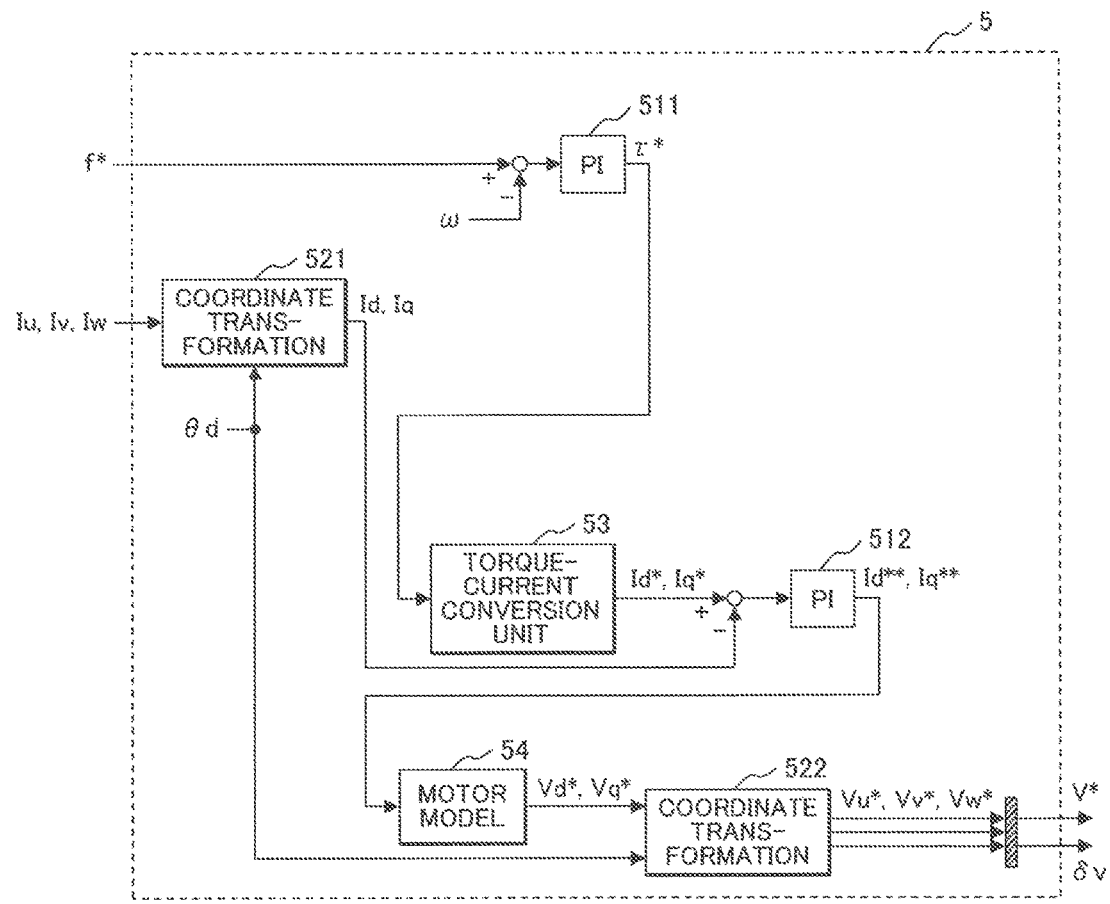
FIG. 10 is a configuration diagram of a motor control system according to a second embodiment.

FIG. 10 is a configuration diagram of a second embodiment. However, the same points as those of the first embodiment will be omitted. In the second embodiment, the voltage command calculating unit 5 has a structure of speed control type vector control, and includes a PI control unit 511, a PI control unit 512, a coordinate transforming unit 521, a torque-current conversion unit 53, and a motor model 54.

The PI control unit 511 performs the PI control on the difference between the rotational speed command f* and the rotational speed ω to calculate the torque command τ*. The PI control unit 512 performs the PI control on the difference between the d-axis current command Id*, the q-axis current command Iq* and the d-axis current Id, the q-axis current Iq to calculate the d-axis current command Id and the q-axis current command Iq. The coordinate transforming unit 521 transforms the three-phase alternating currents Iu, Iv, and Iw into the d-axis current Id and the q-axis current Iq, using the rotor phase θd as illustrated in FIG. 2. As with the coordinate transforming unit 521, the coordinate transforming unit 522 converts the d-axis voltage command Vd* and the q-axis voltage command Vq* into three-phase AC voltage commands Vu*, Vv*, and Vw*. The three-phase AC voltage commands Vu*, Vv*, and Vw* are converted into a voltage command V* and a voltage phase δv (FIG. 2), and are output from the voltage command calculating unit 5. The torque-current conversion unit 53 converts the torque command τ* into a d-axis current command Id* and a q-axis current command Iq* by using (Equation 1). The motor model 54 is a model of the motor 1, and converts the d-axis current command Id* and the q-axis current command Iq* into a d-axis voltage command Vd* and a q-axis voltage command Vq*.

According to the configuration of FIG. 10, it is possible to independently control the d-axis component and the q-axis component of the motor 1. As a result, since the non-interference control of the motor 1 is achieved, responsiveness to the speed command f* is improved. In particular, in the present invention, it is possible to provide a motor control system that is excellent in both responsiveness and robustness, by improving responsiveness through the voltage command calculating unit 5 and by improving robustness through the voltage adjusting unit 9. Incidentally, instead of the speed control type, the same applies to the torque control type.

Third Embodiment

Figure 11:
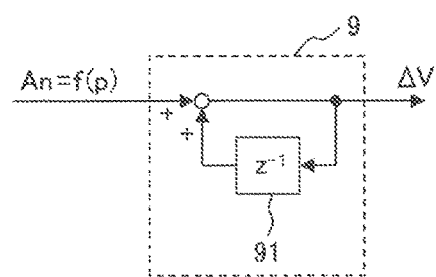
FIG. 11 is a configuration diagram of a motor control system according to a third embodiment.

FIG. 11 is a configuration diagram of the third embodiment. However, the same points as those of the first embodiment will be omitted. In the third embodiment, the voltage adjusting unit 9 adopts a constitution of integral calculation and includes a delay element 92. In other words, the voltage adjusting unit 9 includes an integrating unit. The effect of this is as follows.

(1) It is possible to separate the responsiveness of the voltage command calculating unit 5 and the voltage adjusting unit 9. That is, even if the voltage adjusting unit 9 is newly added to the existing voltage command calculating unit 5, the response of the voltage command V* and the adjustment voltage $\Delta V$ do not interfere with each other, and the instability of the motor control system can be prevented.

(2) Robust against high frequency noise of the quantity of state p included in the abnormality degree An is achieved.

In this way, since the voltage adjusting unit 9 includes the integrating unit, it is possible to improve the robustness, without changing the existing motor control system. Although the responsiveness of the adjustment voltage $\Delta V$ is lowered, the responsiveness of the motor control system can be secured by the voltage command calculating unit 5.

Fourth Embodiment

Figure 12:
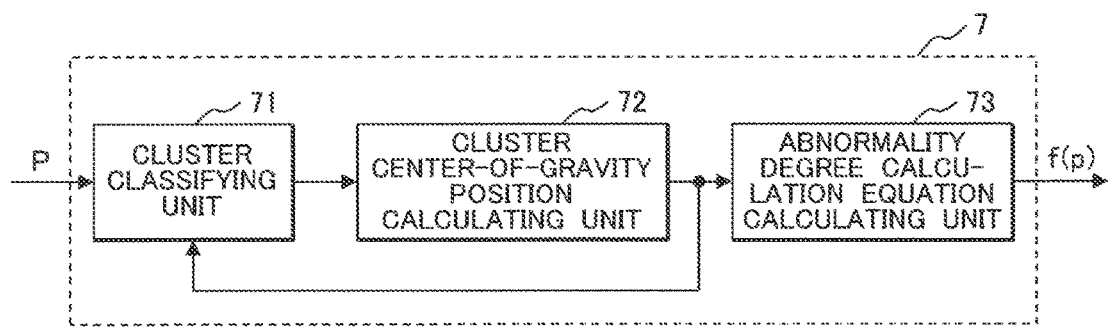
FIG. 12 is a configuration diagram of a motor control system according to a fourth embodiment.

FIG. 12 is a configuration diagram of a fourth embodiment. However, the same points as those of the first embodiment will be omitted. In the fourth embodiment, the abnormality degree calculation equation updating unit 7 includes a cluster classifying unit 71, a cluster center-of-gravity position calculating unit 72, and an abnormality degree calculation equation calculating unit 73, and has the function of vector quantization clustering as a whole.

Figure 13:
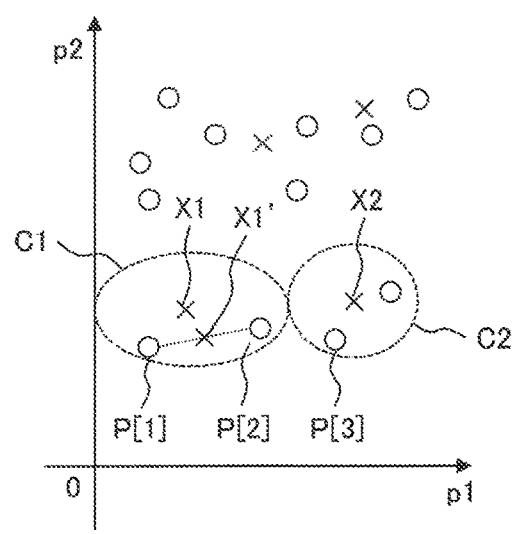
FIG. 13 is an example of cluster classification in the fourth embodiment.

The cluster classifying unit 71 classifies the data set P into the respective clusters based on the cluster center of gravity X, and outputs the classification result Q thereof. FIG. 13 illustrates an example of the cluster classification. P[1] and P[2] and P[3] represent a part of the data set P, X1, X2 and X3 represent cluster centers of gravity, and C1 and C2 represent the clusters. Since the data P[1] and P[2] are close to the cluster center of gravity X1, they are classified into the cluster C1. On the other hand, since the data P[3] is close to the cluster center of gravity X2, it is classified into the cluster C2. Therefore, the classification result Q relating to the data P[1] to [3] is "P[1]∈C1, P[2]∈C1, P[3]∈C2".

The cluster center-of-gravity position calculating unit 72 recalculates the position of the cluster center of gravity X and outputs it. For example, in FIG. 13, only the P[1] and P[2] are included in the cluster C1, and the center of them is taken as a new center of gravity X1. Since the cluster center-of-gravity position calculating unit 72 outputs the position of the new center of gravity X to the cluster classifying unit 71, the cluster classifying unit 71 performs the cluster classification again. By repeating the cluster classification, the position of the cluster center of gravity X becomes a position suitable for representing the dispersion situation of the data set P.

The position of the new center of gravity X is also output to the abnormality degree calculation equation calculating unit 73. The abnormality degree calculation equation calculating unit 73 outputs the abnormality degree calculation equation f(p) with respect to a certain quantity of state p by setting the distance from the center of gravity X which is the shortest distance as the abnormality degree An. That is, the abnormality degree calculation equation f(p) is as follow.

[Equation 2]

$$f(p) = \min(r(p, X_1), r(p, X_1), \ldots, r(p, X_n)) \quad \text{(Equation 2)}$$

Here r: distance calculation equation, Xn: nth center of gravity.

The distance calculation equation $r(p, X_n)$ is defined by, for example, a linear distance in orthogonal coordinates.

The effects of the above configuration are as follows.

(1) If the data set P is sufficient, the cluster center of gravity X is automatically calculated by the cluster classifying unit 71 and the cluster center-of-gravity position calculating unit 72. Further, it is possible to quantitatively define the distribution of the data set P, that is, the state when the driving target 4 is normal, by the cluster center of gravity X.

(2) Based on the cluster center of gravity X, it is possible to detect the change in distribution of the data set P, that is, the occurrence of abnormality of the driving target 4.

In this way, by including the cluster classifying unit 71, the cluster center-of-gravity position calculating unit 72, and the abnormality degree calculation equation calculating unit 73, it is possible to detect the occurrence of abnormality of the driving target 4, without requiring any adjustment work.

REFERENCE SIGNS LIST

1: motor
2: inverter
3: current detecting unit
4: driving target
41: cylinder
42: state quantity detecting unit
5: voltage command calculating unit
6: storage unit
7: abnormality degree calculation equation updating unit
8: abnormality degree calculating unit
9: voltage adjusting unit
11: coupling unit
21: main circuit
22: gate drive circuit
53: torque-current conversion unit
54: motor model
71: cluster classifying unit
72: cluster center of gravity position calculating unit
73: abnormality degree calculation equation calculating unit
91: abnormality degree and adjustment voltage conversion table
92: delay element
511: PI control unit
512: PI control unit
521: coordinate transforming unit
522: coordinate transforming unit

The invention claimed is:

1. A motor control system comprising:
an inverter which outputs a voltage to a motor based on a voltage command;
a current detecting unit which outputs a current detection value based on a current flowing through the motor;
a voltage command calculating unit which outputs the voltage command based on a high-order command and the current detection value;
a storage unit which outputs a data set of a quantity of state based on the quantity of state of a driving target of the motor;
an abnormality degree calculation equation updating unit which outputs an abnormality degree calculation equation for computing the abnormality degree of the driving target based on the data set;
an abnormality degree calculating unit which outputs an abnormality degree based on the quantity of state and the abnormality degree calculation equation; and
a voltage adjusting unit which outputs an adjustment voltage for adjusting the voltage command based on the abnormality degree.

2. The motor control system according to claim 1, wherein the voltage command calculating unit resets the voltage command to zero when the abnormality degree is 1 or more after startup of the motor, and
the voltage adjusting unit outputs the adjustment voltage at least once based on the abnormality degree.

3. The motor control system according to claim 1, wherein the voltage command is a sinusoidal wave synchronized with a drive frequency of the motor, and
the adjustment voltage is a harmonic which is synchronized with a drive frequency of the motor.

4. The motor control system according to claim 1, wherein the abnormality degree calculation equation updating unit outputs two or more of the abnormality degree calculation equations,
the abnormality degree calculating unit outputs two or more of the abnormality degrees, and
the voltage adjusting unit controls the adjusted voltage such that another at least one of the abnormality degrees is a minimum value in a range in which at least one of the abnormality degrees is a predetermined value or less.

5. The motor control system according to claim 1, further comprising:
a coupling unit provided between the motor and the driving target, wherein the coupling unit separates the motor and the driving target from each other, subsequently, the abnormality degree calculation equation updating unit outputs the abnormality degree calculation equation at least once, and subsequently, the coupling unit reconnects the motor and the driving target.

6. The motor control system according to claim 1, wherein the storage unit outputs a data set of the quantity of state and the current detection value.

7. The motor control system according to claim 1, wherein the abnormality degree calculating unit outputs an abnormality degree based on the quantity of state, the data set and the abnormality degree calculation equation.

8. The motor control system according to claim 1, wherein the update cycle of the abnormality degree calculation equation updating unit is longer than the calculation cycle of the abnormality degree calculating unit.

9. The motor control system according to claim 1, wherein the voltage command calculating unit includes a vector control unit.

10. The motor control system according to claim 1, wherein the voltage adjusting unit includes an integrating unit.

11. The motor control system according to claim 1, wherein the abnormality degree calculation equation updating unit includes a vector quantization clustering unit.

\* \* \* \* \*